(12) United States Patent
Mawrey

(10) Patent No.: US 11,371,841 B2
(45) Date of Patent: Jun. 28, 2022

(54) SYSTEM AND METHOD OF TILT SENSOR TIDE AND INLAND WATER LEVEL GAUGE

(71) Applicant: Robert Stanley Mawrey, Ashland, MA (US)

(72) Inventor: Robert Stanley Mawrey, Ashland, MA (US)

( * ) Notice: Subject to any disclaimer, the term of this patent is extended or adjusted under 35 U.S.C. 154(b) by 312 days.

(21) Appl. No.: 16/841,099

(22) Filed: Apr. 6, 2020

(65) Prior Publication Data

US 2021/0310806 A1    Oct. 7, 2021

(51) Int. Cl.
*G01C 13/00* (2006.01)
*G01C 3/30* (2006.01)
*G04B 47/06* (2006.01)

(52) U.S. Cl.
CPC ............. *G01C 13/004* (2013.01); *G01C 3/30* (2013.01); *G04B 47/06* (2013.01)

(58) Field of Classification Search
CPC .... G01C 13/006; G01C 13/004; G01C 13/00; G01C 13/002; G01C 13/008; G01C 5/06; G01C 17/34; G01C 21/16; G01C 25/00; G01C 5/04; G01C 9/00; G01C 9/06; G01C 9/12; G01C 9/14; G01C 9/18
USPC ......................................... 73/170.16–170.29
See application file for complete search history.

(56) References Cited

U.S. PATENT DOCUMENTS

| 2004/0093940 A1* | 5/2004 | Joseph | G01C 13/008 |
| | | | 73/290 V |
| 2009/0095208 A1* | 4/2009 | Cardoza | B63H 25/42 |
| | | | 114/144 R |

FOREIGN PATENT DOCUMENTS

| CN | 111409774 A | * | 7/2020 |
| CN | 112556643 A | * | 3/2021 |
| CN | 111409774 B | * | 4/2021 |
| CN | 112902917 A | * | 6/2021 |
| CN | 113386923 A | * | 9/2021 |
| KR | 100753774 B1 | * | 7/2020 |
| KR | 102345300 B1 | * | 12/2021 |

* cited by examiner

*Primary Examiner* — Andre J Allen

(57) ABSTRACT

A method of measuring tides and inland water levels is provided. The method comprises a computer receiving a first measurement of an angle formed by a first ray comprising a vertical fixed piling and a second ray formed by a downward sloping ramp of known length, a lower end of the ramp contacting a surface of a dock float and the surface representing a plane contacting the fixed piling at a 90-degree angle at a first meeting point. The computer then calculates, based on the first measurement, based on the ramp length, and based on the 90-degree angle, a first distance from the first meeting point to a vertex of the angle. The computer later receives a second measurement of the angle, wherein the plane meets the piling at a second meeting point. The computer calculates a second distance and expressing a difference between two distances as tidal change.

20 Claims, 5 Drawing Sheets

SYSTEM AND METHOD OF TILT SENSOR TIDE AND INLAND WATER LEVEL GAUGE

CROSS REFERENCE TO RELATED APPLICATIONS

The present disclosure is related to U.S. Provisional Patent Application No. 62/852,344 filed May 24, 2019, the contents of which are incorporated herein in their entirety.

SCOPE OF THE INVENTION

The present disclosure is in the field of water level measurement devices. More particularly, the present disclosure provides systems and methods of periodically measuring an angle of a downward sloping ramp to a dock float as a means to determine varying tidal levels in large bodies of water.

BACKGROUND

Tide gauges are expensive and cumbersome to install and operate. Major types of tide gauges in the prior art include those that perform ultrasonic measuring of distance to water surface and microwave (radar) measuring distance to water surface. A float may be used in a well connected by wires and pulleys to a sensor (drum or other). A pressure bubbler may be used that forces gas down a tube into water and measures required air pressure to produce meaningful results. More pressure may be required at greater depths.

Submersible pressure gauges are also provided by the prior art. Such gauges involve a pressure sensor typically inside a protective case placed in water to measure pressure. The pressure is proportional to water level.

Issues with the previous implementations including those described above including high cost, primarily for mechanical structures needed to mount gauges. Bubblers have complexity, maintainability and calibration issues. Submersible gauges do not have long useful lives because of corrosion.

While military, naval, and commercial marine bodies have developed and used tidal gauges for years, such gauges are expensive to purchase and operate. Consumer and leisure boater gauges have not been developed to date.

DETAILED DESCRIPTION

Figure 1:
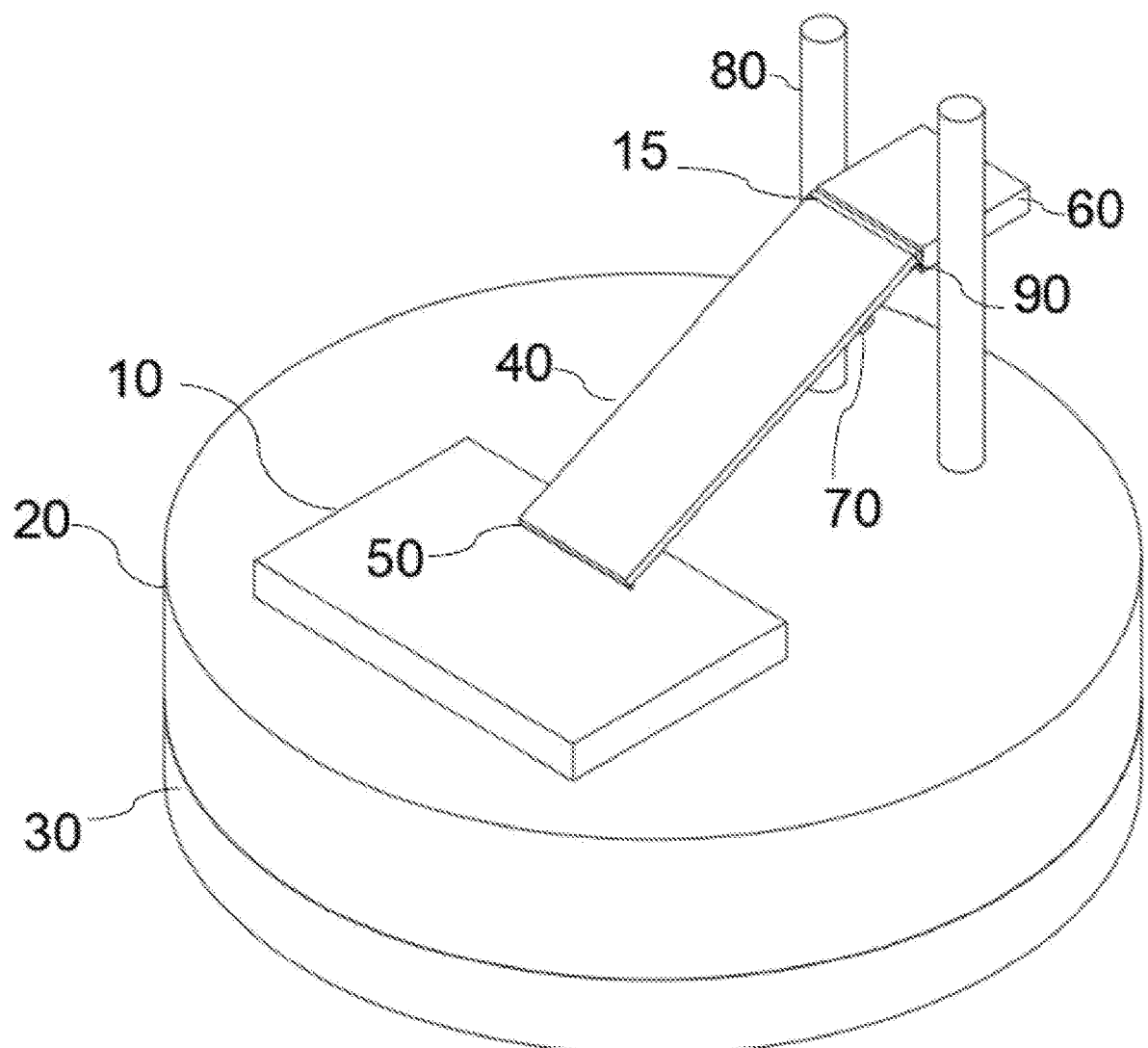
FIG. 1 is block diagram of a system of a tit sensor tide and inland water level gauge according to an embodiment of the present disclosure.

Systems and methods described herein provide for calculating water levels in fresh water or oceanic bodies of water where water level varies, typically based on tidal activity. A computer-based system, which may be local or remote to the body of water, receives entry of required dimensions for calculation of water levels.

The system periodically receives tilt angle readings or measurements from a sensor attached to a ramp. At its upper end the ramp is attached to a fixed piling or post. The lower end of the ramp rests loosely on a dock float. As the tide and consequently the dock float rises and falls, the sensor measures changes in angle of the ramp. With the angle and other measures known, the system at regular intervals determines water levels, and thus measures of tidal changes.

The ramp is attached via hinge at an upper end to the at least one fixed vertical piling positioned near a shore of a body of water. The piling may support a fixed horizontal walkway that allows boaters to walk from the shore to the top of the ramp that leads downward to the dock float where watercraft may be moored. The length of the ramp is known. The angle of the horizontal dock float and water upon which the float rests to the vertical piling is a constant 90 degrees.

Using arcsin trigonometry and having determined the angle of the ramp, the length of the ramp, and the constant 90-degree angle of the water surface to the piling, the level of the water in relation to the point at which the upper end of the ramp attaches to the piling can be determined. As the tide rises and falls, this level changes and hence the length of one leg of a right triangle may be determined. This length, which changes as the tide changes, is measured periodically and can be used to build tide tables.

A computer that is proximate or remote may periodically receive tilt angle measurements of the ramp and calculate water levels and tidal changes. The computer may publish this information for use by boaters and others.

The sensor may be a micromechanical tilt device or a mems tilt device. The sensor may be a resistive tilt device or a capacitive tilt device. Each of these devices calibrates a relationship between the angle and the level of the water using simple trigonometry.

A user may inexpensively and conveniently create water level (tide) gauges anywhere there is an existing pivoted gangway or ramp with a float. Other benefits are that the sensor can be made very small and be very unobtrusive and can even be hidden underneath the gangway so that there is no visual or other detraction. The sensor can be wireless or wired to the communication and logging device and it can be powered by solar or battery or mains power.

In an embodiment, a computer receives a first measurement of an angle formed by a first ray comprising a vertical fixed piling and a second ray formed by a downward sloping ramp of known length, a lower end of the ramp contacting a surface of a dock float and the surface representing a plane contacting the fixed piling at a 90-degree angle at a first meeting point. The computer then calculates, based on the first measurement, based on the ramp length, and based on the 90-degree angle, a first distance from the first meeting point to a vertex of the angle.

After a time period, the computer receives a second measurement of the angle, wherein the plane meets the piling at a second meeting point. The computer then calculates, based on the second measurement, based on the ramp length, and based on the 90-degree angle, a second distance from the second meeting point to the vertex. The computer expresses a difference between the first distance and the second distance as a tidal change.

The measurements are received from a sensor. The microelectromechanical systems tilt sensor is mounted on the ramp. The angular strap angle sensor is mounted proximate the vertex and contacts the piling and the ramp. The vertex of the angle is a meeting point of an upper end of the downward sloping ramp and the piling. The computer adjusts the calculations for height of the dock float. The time period may be an hour, two hours, five hours, or other period of time.

A system for measuring tides and inland water levels is provided comprising a processor and a memory. The system also comprises an application stored in the memory that when executed on the processor periodically receives tilt angle measurements of a sloping ramp of known length. The ramp is attached via hinge at an upper end to a fixed piling and contacting, at a lower end, a dock float device floating on a body of water. For each received measurement, the application determines level of water supporting the dock float. The application expresses differing determined levels of water as measures of tides.

Turning to the figures, FIG. 1 is a diagram of a perspective view of a typical walkway with ramp and float used to provide access to watercraft where the water level varies. FIG. 1 shows a typical embodiment of a fixed walkway 60 with ramp 40 and float 10 found throughout coastal or inland waters to provide human access to boats where the water level varies in height. The float 10 is typically also held in place with additional pilings 80 that allow the float 10 to rise and fall with water depth.

Also illustrated in FIG. 1 are a ramp roller 50, a ramp pivot 15, and water 20. FIG. 1 also depicts a bottom of water body 30 as well as a microelectromechanical systems tilt sensor 70 and a capacitive tilt sensor strap 90 which are collectively referred to herein as placement sensors 70, 90.

Figure 2:
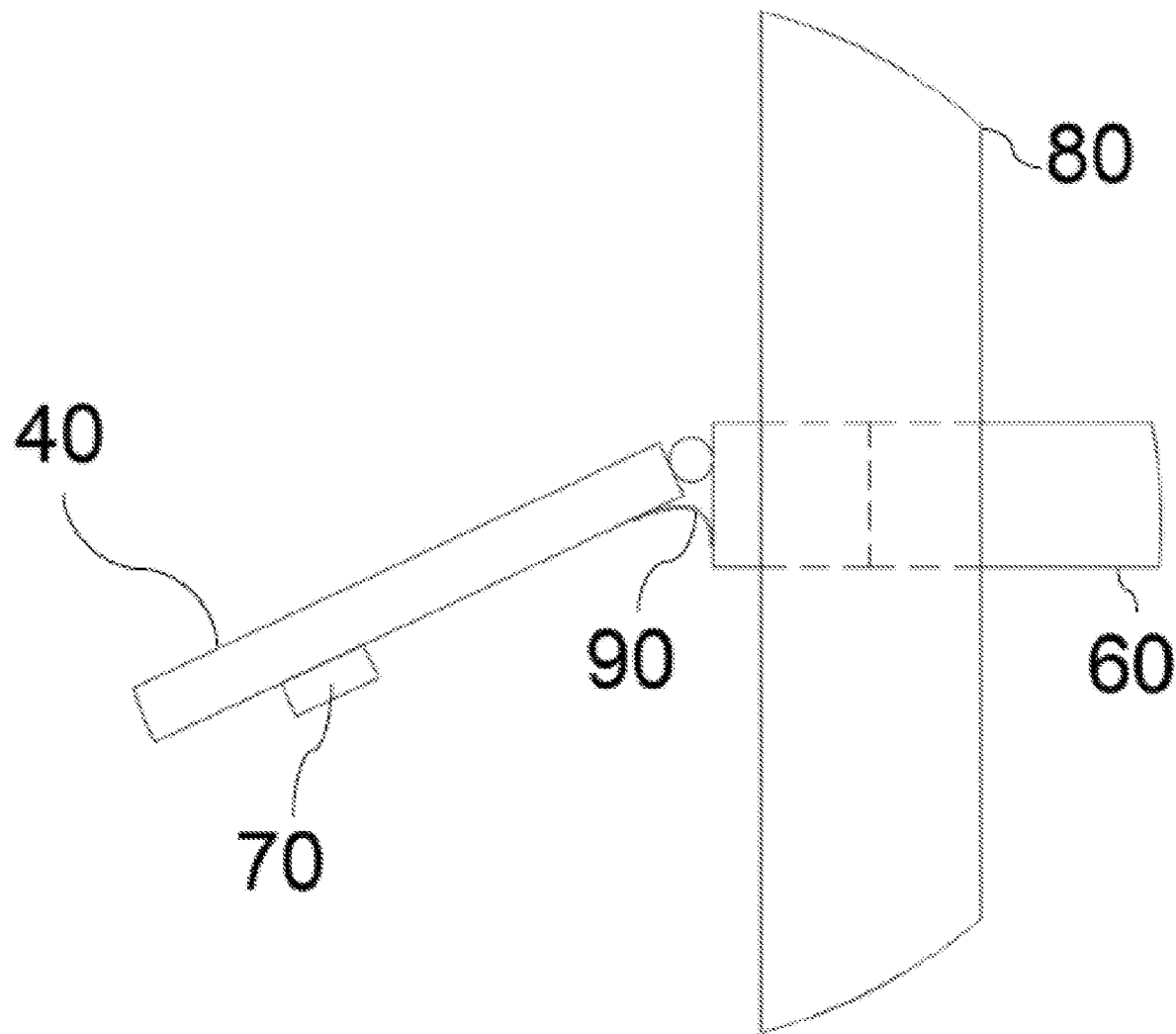
FIG. 2 is block diagram of a system of a tit sensor tide and inland water level gauge according to an embodiment of the present disclosure.

FIG. 2 is a close up view of the ramp pivot 15 and the placement sensors 70, 90 that measure the tilt of the ramp. There are many sensor types available to measure tilt angle. FIG. 2 shows two possible embodiments. One is the microelectromechanical systems tilt sensor 70 and the other is an angular strap angle sensor 90. The angle data from a sensor is communicated and stored either locally to a display and memory or to the internet via wired or wireless communication.

Examples of the microelectromechanical systems sensor 70 is the Analog Devices ADIS16209 High Accuracy, Dual-Axis Digital Inclinometer and Accelerometer. One example of the angular strap sensor 90 is the Flex Sensor by Bend Labs.

Figure 3:
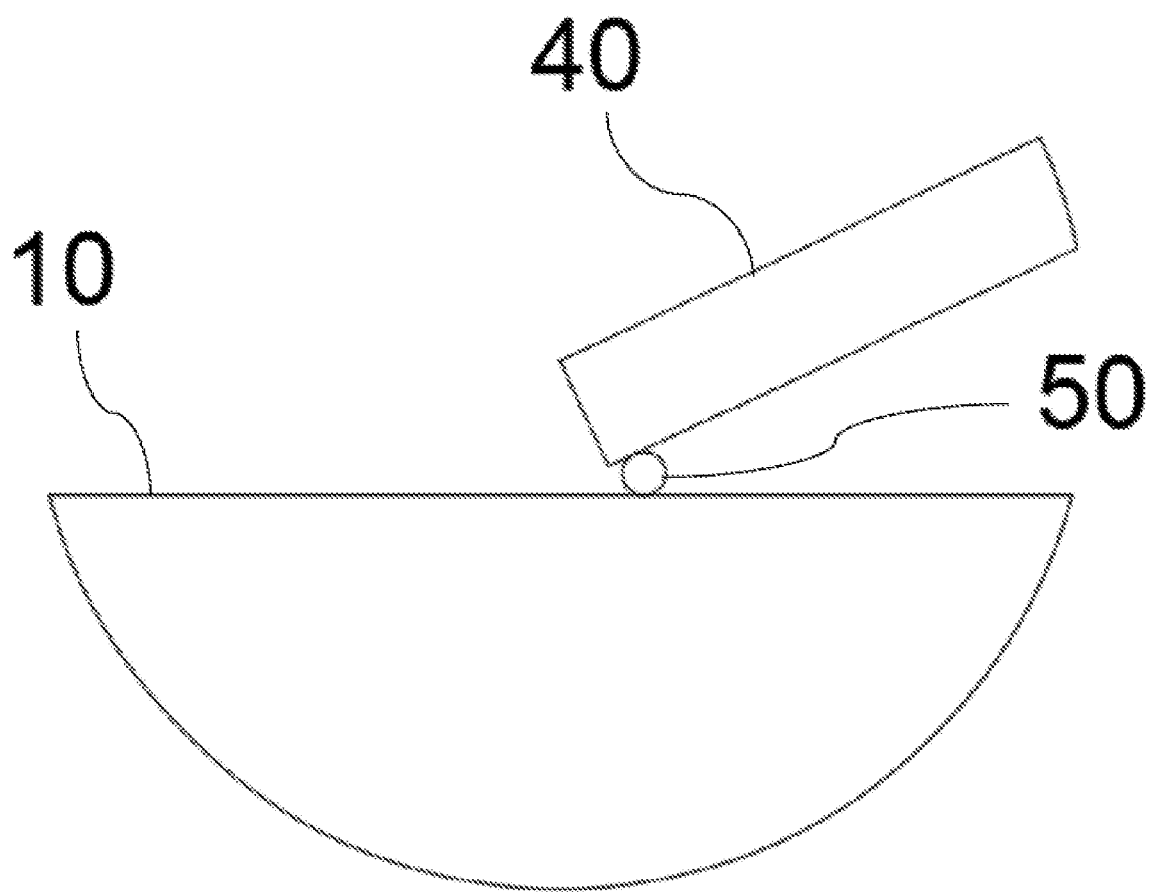
FIG. 3 is block diagram of a system of a tit sensor tide and inland water level gauge according to an embodiment of the present disclosure.

FIG. 3 depicts the ramp roller 50 at the bottom of the ramp 40. The ramp roller 50 allows the ramp 40 to move back and forth along the float 10.

Figure 4:
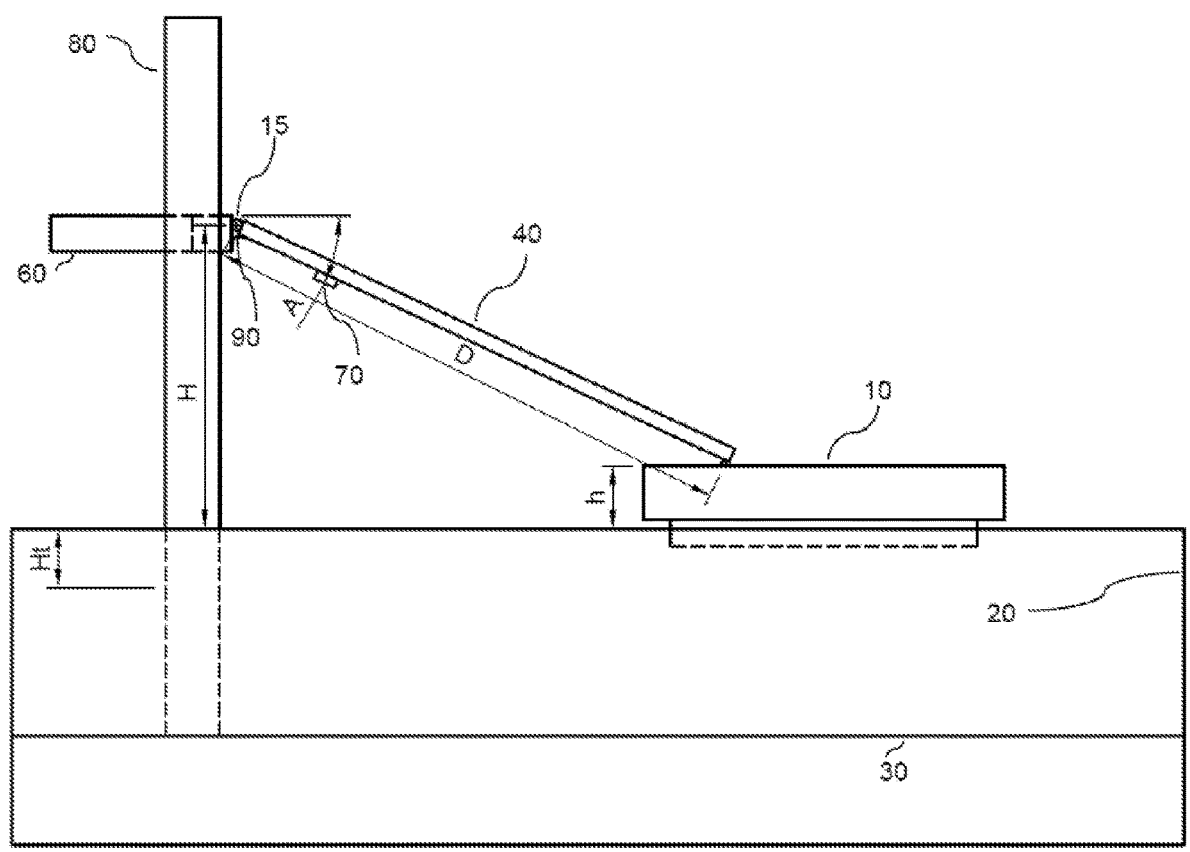
FIG. 4 is block diagram of a system of a tit sensor tide and inland water level gauge according to an embodiment of the present disclosure.

FIG. 4 is a side view of the walkway 60, ramp 40, and float 10 with either a microelectromechanical systems sensor 70 mounted on the ramp 10 or an angular flex sensor 90 mounted to measure angles between the ramp 10 and the piling 80. Dimensions and angles are shown that enable sensor angle to be converted to water level using arcsin trigonometry. The distance D between the center of the ramp pivot 15 and the bottom of the ramp 10, height H of the center of the ramp pivot 15 or hinge, the water surface, and the float height h from the top of the float 10 to the surface of the water are recorded for a particular water level. With these data the water level Ht relative to a desired datum is calculated using arcsin trigonometry with the ramp tilt angle A as the input variable measured by at least one of the placement sensors 70, 90.

Figure 5:
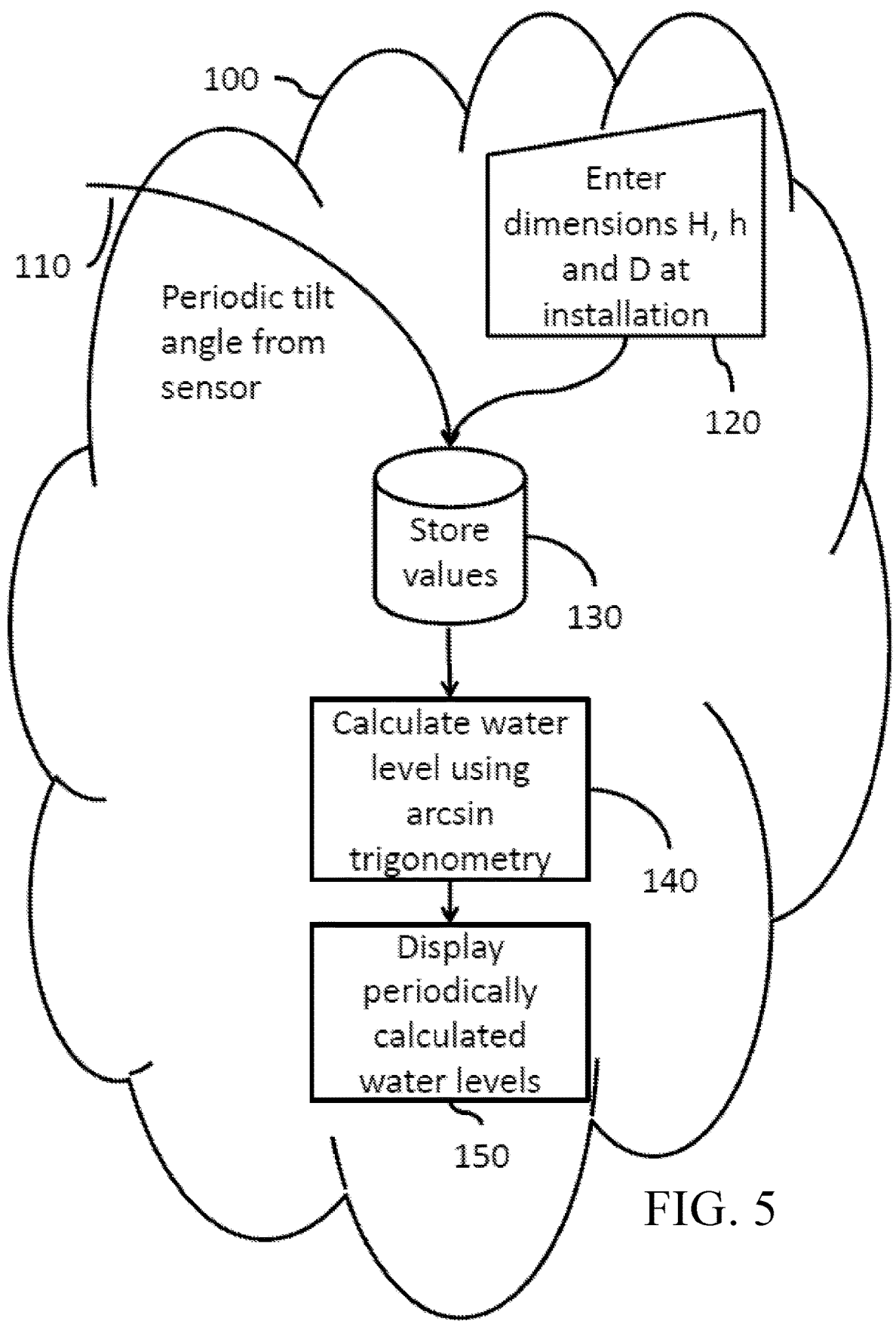
FIG. 5 is flowchart of a method of a tit sensor tide and inland water level gauge according to an embodiment of the present disclosure.

FIG. 5 depicts steps of a method to enter required dimensions for the calculation of water level 120, to periodically receive and store 130 ramp tilt angle readings from a sensor 110, to calculate the water level using trigonometry 140 and to display the calculated water levels 150. Some embodiments involve computer-based systems operating on remote servers connected to the Internet 100. Other embodiments may include the operations shown in FIG. 5 occurring on computers local to the sensors 110 connected to the sensors 110 by wire or wireless communication with local interfaces for data entry and display.

As noted, various types of sensors or devices may be used to calibrate the relationship between the angle of the ramp and the level of the water with simple trigonometry aiding the calculations if necessary. In addition to micromechanical tilt device, other types of water level sensors including pressure sensors, ultrasonic range sensors, and microwave range sensors may be used and then removed if appropriate. These alternative devices may be used to calibrate the relationship between the ramp angle and water level and calibrate using any of the tide level techniques described above.

The invention claimed is:

1. A method of measuring tides and inland water levels, comprising:
   a computer receiving a first measurement of an angle formed by a first ray comprising a vertical fixed piling and a second ray formed by a downward sloping ramp of known length, a lower end of the ramp contacting a surface of a dock float and the surface representing a plane contacting the fixed piling at a 90-degree angle at a first meeting point;
   the computer calculating, based on the first measurement, based on the ramp length, and based on the 90-degree angle, a first distance from the first meeting point to a vertex of the angle;
   the computer receiving, after a time period, a second measurement of the angle, wherein the plane meets the piling at a second meeting point;
   the computer calculating, based on the second measurement, based on the ramp length, and based on the 90-degree angle, a second distance from the second meeting point to the vertex; and
   the computer expressing a difference between the first distance and the second distance as a tidal change.

2. The method of claim 1, further comprising the computer receiving the first measurement and the second measurement from a sensor.

3. The method of claim 2, wherein the sensor is at least one of a microelectromechanical systems tilt sensor and an angular strap angle sensor.

4. The method of claim 3, wherein the microelectromechanical systems tilt sensor is mounted on the ramp.

5. The method of claim 3, wherein the angular strap angle sensor is mounted proximate the vertex and contacts the piling and the ramp.

6. The method of claim 1, wherein the vertex of the angle is a meeting point of an upper end of the downward sloping ramp and the piling.

7. The method of claim 1, wherein the computer uses arcsin trigonometry in determining the first distance and the second distance.

8. The method of claim 1, wherein the computer adjusts the calculations for height of the dock float.

9. The method of claim 1, wherein the time period is one of an hour, two hours, and five hours.

10. A system for measuring tides and inland water levels, comprising:
   a processor;
   a memory; and
   an application stored in the memory that when executed on the processor:

periodically receives tilt angle measurements of a sloping ramp of known length, the ramp attached via hinge at an upper end to a fixed piling and contacting, at a lower end, a dock float device floating on a body of water;

for each received measurement, determines level of water supporting the dock float; and expresses differing determined levels of water as measures of tides.

11. The system of claim 10, wherein the application receives the measurements from a sensor.

12. The system of claim 10, wherein the sensor is mounted one of on the ramp and proximate a vertex of the angle at the hinge.

13. The system of claim 10, wherein the application accounts for a height of the dock float in determining levels of water.

14. The system of claim 10, wherein the application uses arcsin trigonometry to determine level of water supporting the dock float.

15. A method of measuring tides and inland water levels, comprising:

a computer receiving, on a periodic basis, tilt angle measurements of a sloping ramp of known length, the ramp attached via hinge at an upper end to a fixed piling and contacting, at a lower end, a dock float;

the computer, for each received measurement, determining level of water supporting the dock float; and the computer expressing differing determined levels of water as measures of tides.

16. The method of claim 15, further comprising the computer receiving the measurements from a sensor.

17. The method of claim 16, wherein the sensor is mounted one of on the ramp and proximate a vertex of the angle at the hinge.

18. The method of claim 15, further comprising the computer accounting for a height of the dock float in determining levels of water.

19. The method of claim 15, wherein periodic intervals comprise one of one hour, two hours, and five hours.

20. The method of claim 15, further comprising the computer using arcsin trigonometry to determine level of water supporting the dock float.

* * * * *